UNITED STATES PATENT OFFICE.

WILLIAM G. ABBOTT, JR., OF LYNN, MASSACHUSETTS, ASSIGNOR TO GENERAL ELECTRIC COMPANY, A CORPORATION OF NEW YORK.

SOLID TITANIUM-CARBID STICK-ELECTRODE.

1,099,138. Specification of Letters Patent. Patented June 2, 1914.

No Drawing. Application filed June 1, 1910. Serial No. 564,487.

*To all whom it may concern:*

Be it known that I, WILLIAM G. ABBOTT, Jr., a citizen of the United States, residing at Lynn, county of Essex, State of Massachusetts, have invented certain new and useful Improvements in Solid Titanium-Carbid Stick-Electrodes, of which the following is a specification.

My invention relates to arc-light electrodes of the kind which are generally spoken of as titanium carbid electrodes, and the object of the invention is to confer upon such electrodes certain physical characteristics by reason of which the crumbling of the electrodes at the arcing end is avoided and the lighting power is increased.

The value of titanium in an electrode is well recognized, and it has been proposed to form a solid homogeneous electrode of titanium carbid and tar or other binding agent, shape the mixture into the form of sticks and bake the sticks thus formed. Electrodes made in this manner, however, are more or less brittle and exhibit a tendency to crumble in the vicinity of the arc. I have found that by adding to the titanium carbid a suitable amount of rutile, together with a carbonizable agent, such as glucose solution or tar, or carbon powder with such binding agent, squirting the mixture thus formed, and subsequently firing the stick at a suitable temperature, a much stronger electrode is obtained, one that is far less brittle and which does not crumble away in the vicinity of the arc. The usual or any improved flux may be incorporated with the electrode thus formed by immersing the electrode in a solution of the flux sufficiently long to have it impregnated with the flux, and then allow the electrode to dry.

The following method of making my improved electrode gives excellent results: Titanium carbid and rutile in the proportions of 1000 parts of carbid and 140 parts of rutile are powdered and mixed with 150 parts of glucose solution of a density of about 1.4. The mixture is then squirted through a suitable die, and the resulting sticks thus formed are fired in a suitable furnace at a temperature between 1500 and 2000 degrees centigrade, preferably at about 1800 degrees. At this temperature much of the rutile, $TiO_2$, is reduced to titanium sub-oxid $TiO$, which itself acts as a binder or cement of equal lighting power for the titanium carbid and being formed *in situ* the titanium sub-oxid is more uniformly distributed throughout the mass of the electrode than if it were mechanically mixed with the same. The resulting electrode is tough and is not easily broken. Furthermore, the titanium sub-oxid fuses more readily than the carbid and effectively prevents the crumbling away of the electrode in the vicinity of the arc during the operation of the lamp. By reason of the low fusing point of titanium sub-oxid, an electrode made of this material alone is being consumed with undue rapidity, while when used sparingly as an admixture to titanium carbid, as above described, it serves as an effective binder for the titanium carbid particles, and the resulting electrode is free of the defects of both an electrode formed of titanium carbid alone and an electrode formed of titanium sub-oxid alone.

While the electrode made as above described is suitable for use without further treatment, its efficiency and the steadiness of the arc are enhanced by incorporating with it a suitable flux, such as sodium fluorid. This may be done by immersing the fired electrode in a saturated sodium fluorid solution. Of course, any other suitable flux may be used. In some cases it is desirable to electro-plate the finished electrode in order to prevent undue oxidation of the materials on the surface and within the electrode body during the operation of the lamp.

While I have indicated the exact proportions of materials that may be used in the process of making my improved electrode, it is to be understood that I am not confined to such proportions but that considerable latitude is permissible, so long as the binder contains sufficient carbon to effect the reduction of the rutile to the sub-oxid in the firing.

What I claim as new and desire to secure by Letters Patent of the United States, is,—

1. An electrode consisting substantially of titanium carbid particles cemented together by titanium sub-oxid.

2. An electrode consisting substantially of powdered titanium carbid and titanium sub-oxid as a cement for the carbid particles, the titanium carbid preponderating.

3. An electrode consisting substantially of powdered titanium carbid and of titanium sub-oxid distributed throughout the mass of the carbid as a cement therefor, and a flux distributed in the mass of the electrode.

In witness whereof, I have hereunto set my hand this 27th day of May, 1910.

WILLIAM G. ABBOTT, Jr.

Witnesses:
JOHN A. McMANUS, Jr.,
CHARLES A. BARNARD.

Copies of this patent may be obtained for five cents each, by addressing the "Commissioner of Patents, Washington, D. C."